United States Patent
Weatherall

(10) Patent No.: US 8,252,220 B2
(45) Date of Patent: Aug. 28, 2012

(54) INJECTION MOLD

(75) Inventor: Douglas James Weatherall, Bolton (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 12 days.

(21) Appl. No.: 12/995,788

(22) PCT Filed: Jun. 5, 2009

(86) PCT No.: PCT/CA2009/000738
§ 371 (c)(1),
(2), (4) Date: Dec. 2, 2010

(87) PCT Pub. No.: WO2010/006408
PCT Pub. Date: Jan. 21, 2010

(65) Prior Publication Data
US 2011/0101567 A1  May 5, 2011

Related U.S. Application Data

(60) Provisional application No. 61/080,735, filed on Jul. 15, 2008.

(51) Int. Cl.
B29C 45/20 (2006.01)
B29C 45/80 (2006.01)
(52) U.S. Cl. ............... 264/328.9; 425/568; 425/569
(58) Field of Classification Search .......... 264/328.9; 425/574, 567, 568, 569
See application file for complete search history.

(56) References Cited

U.S. PATENT DOCUMENTS

| 4,010,903 | A | * | 3/1977 | Sakuri et al. | 425/549 |
| 4,299,791 | A | | 11/1981 | Aoki | |
| 5,374,182 | A | * | 12/1994 | Gessner | 425/562 |
| 6,358,039 | B1 | * | 3/2002 | Manner et al. | 425/564 |
| 7,407,379 | B2 | * | 8/2008 | Fairy | 425/549 |
| 2005/0238748 | A1 | | 10/2005 | Jenko | |

FOREIGN PATENT DOCUMENTS

| JP | 51102047 A1 | 9/1976 |
| JP | 56005746 A | 1/1981 |

* cited by examiner

*Primary Examiner* — Jill Heitbrink
(74) *Attorney, Agent, or Firm* — Husky Intellectual Property Services

(57) ABSTRACT

Disclosed, amongst other things, is a molding apparatus and an injection molding process. The molding apparatus includes a positioner that is configured to regulate, in use, a relative position between a gate member and a nozzle of a melt distribution apparatus between a retracted position and an extended position for adjusting a volume of a nozzle melt reservoir that is definable between the gate member and the nozzle between a reduced volume and an expanded volume, respectively. The injection molding process includes regulating a relative position between a gate member and a nozzle of a melt distribution apparatus, with a positioner, into one of a retracted position and an extended position for adjusting a volume of a nozzle melt reservoir that is definable between the gate member and the nozzle between a reduced volume and an expanded volume, respectively.

10 Claims, 6 Drawing Sheets

INJECTION MOLD

TECHNICAL FIELD

The present invention generally relates to, but is not limited to, molding systems, and more specifically the present invention relates to, but is not limited to, a molding apparatus, and an injection molding process, amongst other things.

BACKGROUND OF THE INVENTION

With reference to FIGS. 1A, 1B, and 1C, this sequence of views depicts various steps within a known injection molding process as executed on a known injection mold 8. FIG. 1A shows the injection mold 8 in a mold closed configuration just prior to injection of a molding material into a molding cavity 14 that is defined therein. FIG. 1B shows the injection mold 8 in the mold closed configuration after completion of a step of injecting the molding material into the molding cavity 14 to form a molded article 15. Lastly, FIG. 1C shows the step of opening of the injection mold 8 into a mold open configuration just prior to an ejection of the molded article 15 from a mold member 10.

The known injection mold 8 includes a melt distribution apparatus 40, a gate member 60, and the mold member 10. The melt distribution apparatus 40 is configured to fluidly connect an injection unit (not shown) with the molding cavity 14 for injecting, in use, the molding material therein via nozzle 20. The molding cavity 14 is definable between the gate member 60 and the mold member 10 when the injection mold 8 is arranged in the mold closed configuration (as shown in FIG. 1A). The gate member 60 is non-movably fixed to the melt distribution apparatus 40. A coolant channel 31 is defined in the gate member 60. The coolant channel 31 is connectable, in use, to a source and sink (not shown) of a coolant media for circulating a coolant therethrough to cool, in use, the gate member 60. The nozzle 20 includes a housing 37, a nozzle tip member 23, and a nozzle tip retainer 26. The nozzle tip retainer 26 cooperates with the housing 37 and the nozzle tip member 23 for coupling the nozzle tip member 23 to the housing 37. A heater 30 surrounds the housing 37 for a heating of the nozzle 20, in use, to maintain the molding material therein at a desired processing temperature.

The gate member 60 defines a pocket 62 that is configured to receive, in use, a forward portion of the nozzle 20 of the melt distribution apparatus 40. The forward portion of the nozzle 20 includes an exposed portion of the nozzle tip member 23 and a skirt portion 27 of the nozzle tip retainer 26. A nozzle interface 64 is defined at a boundary of the pocket 62. Likewise, the nozzle tip retainer 26 defines a gate interface 28 around an outer surface of the skirt portion 27. The nozzle interface 64 and the gate interface 28 are configured to cooperate in providing a sealing junction for preventing a leakage, in use, of a molding material therebetween. The nozzle interface 64 and the gate interface 28 are substantially non-movable (i.e. static) relative to each other when in use. In addition, a melt bubble 19 having a generally fixed volume is defined in a space that is provided between the pocket 62 and the forward portion of the nozzle 20. The gate member 60 further defines a gate passage that is configured to fluidly connect, in use, the melt bubble 19 with the molding cavity 14. The purpose of the melt bubble is to define a space that the molding material will fill and act as an insulating barrier to thermal conduction between the nozzle 20 and the gate member 60, which are heated and cooled, respectively, when in use.

A typical injection molding process includes a step of decompressing the melt distribution apparatus after completion of a hold portion (i.e. sustained melt pressure) of the step of injecting the molding material into the molding cavity 14. The foregoing step is executable by the injection unit wherein an injection piston (or a screw in a reciprocating-screw type of injection unit) is pulled back (i.e. retracted), whereby a suction is created that provides for relief of some of the residual pressure in the melt distribution components (e.g. a manifold—not shown, the nozzle 20, etc.) within the melt distribution apparatus. The step of decompressing is useful in conjunction with the operation of the melt distribution apparatus 40 wherein the nozzle 20 is configured to include a 'hot-tip' for sake of thermal gating. The construction and operation of the nozzle 20 is similar to that described in U.S. Pat. No. 6,609,902 to Blais et al., published on Aug. 26, 2003. Inadequate decompression of a thermally gated nozzle, particularly in conjunction with a short duration molding cycle, can lead to gate drool 17 as shown in FIG. 1C with the opening of the mold, wherein the residual pressure in the melt distribution components causes the flow out of a gate that is defined between the melt bubble 19 and the molding cavity 14. Decompressing of the melt distribution apparatus contributes to the molding cycle time.

SUMMARY OF THE INVENTION

In accordance with a first aspect of the present invention a molding apparatus is provided. The molding apparatus includes a positioner that is configured to regulate, in use, a relative position between a gate member and a nozzle of a melt distribution apparatus between a retracted position and an extended position for adjusting a volume of a nozzle melt reservoir that is definable between the gate member and the nozzle between a reduced volume and an expanded volume, respectively.

In accordance with a second aspect of the present invention an injection molding process is provided. The injection molding process includes regulating a relative position between a gate member and a nozzle of a melt distribution apparatus, with a positioner, into one of a retracted position and an extended position for adjusting a volume of a nozzle melt reservoir that is definable between the gate member and the nozzle between a reduced volume and an expanded volume, respectively.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF THE PREFERRED EMBODIMENT(S)

Figure 2A:
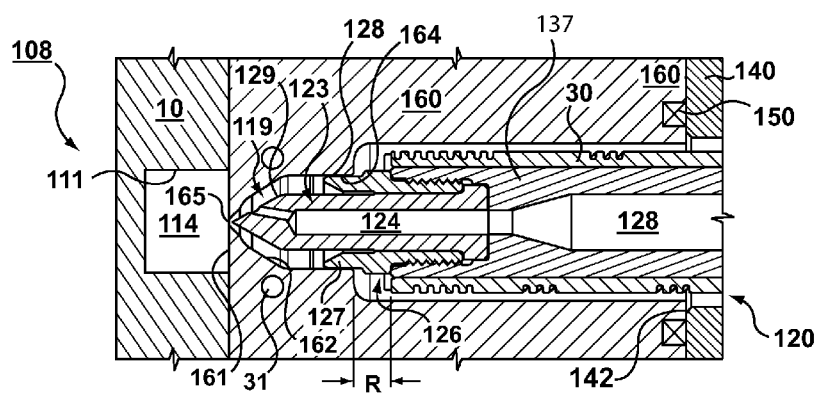
FIG. 2A shows an injection mold in accordance with a non-limiting embodiment of the present invention, the injection mold being arranged in a closed configuration just prior to injection of a molding material into a molding cavity that is defined therein.
Figure 2B:
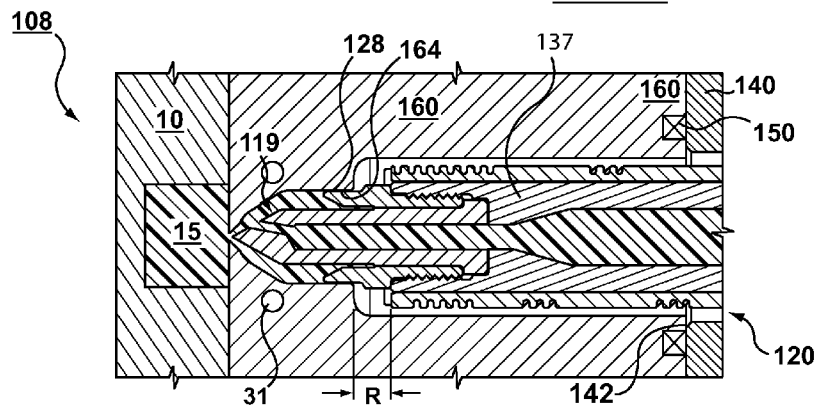
FIG. 2B shows the injection mold of FIG. 2A in the mold closed configuration after completion of a step of injecting the molding material into the molding cavity to form a molded article.
Figure 2C:
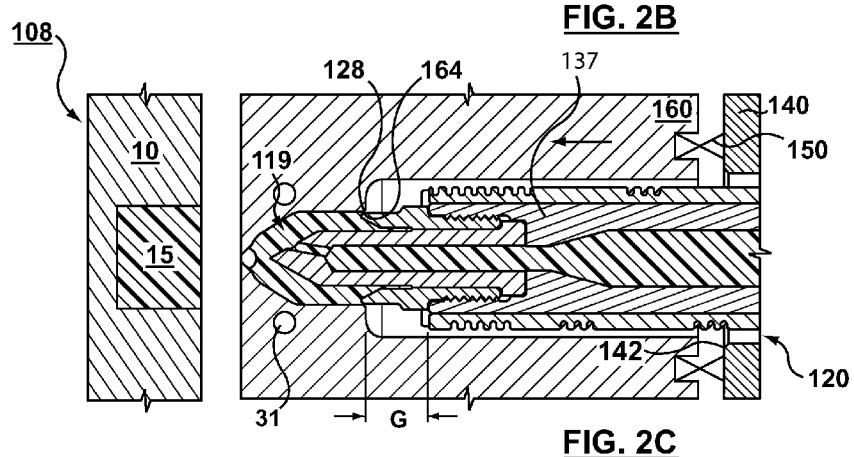
FIG. 2C shows the step of opening of the injection mold of FIG. 2A into a mold open configuration just prior to an ejection of the molded article.
Figure 3:
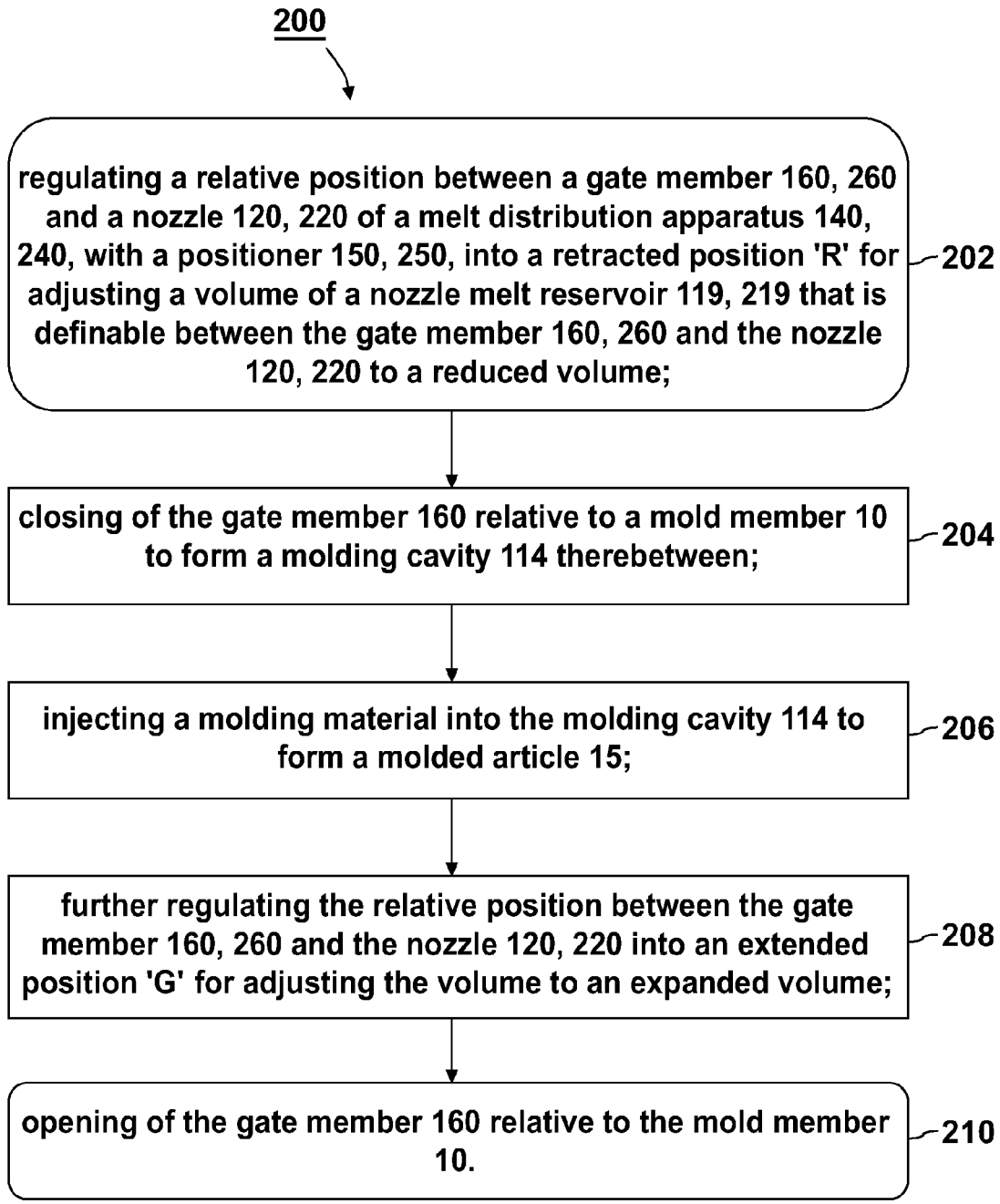
FIG. 3 illustrates the steps of a first variation of an injection molding process that is executable with the non-limiting embodiment of the injection mold of FIG. 2A.
Figure 4:
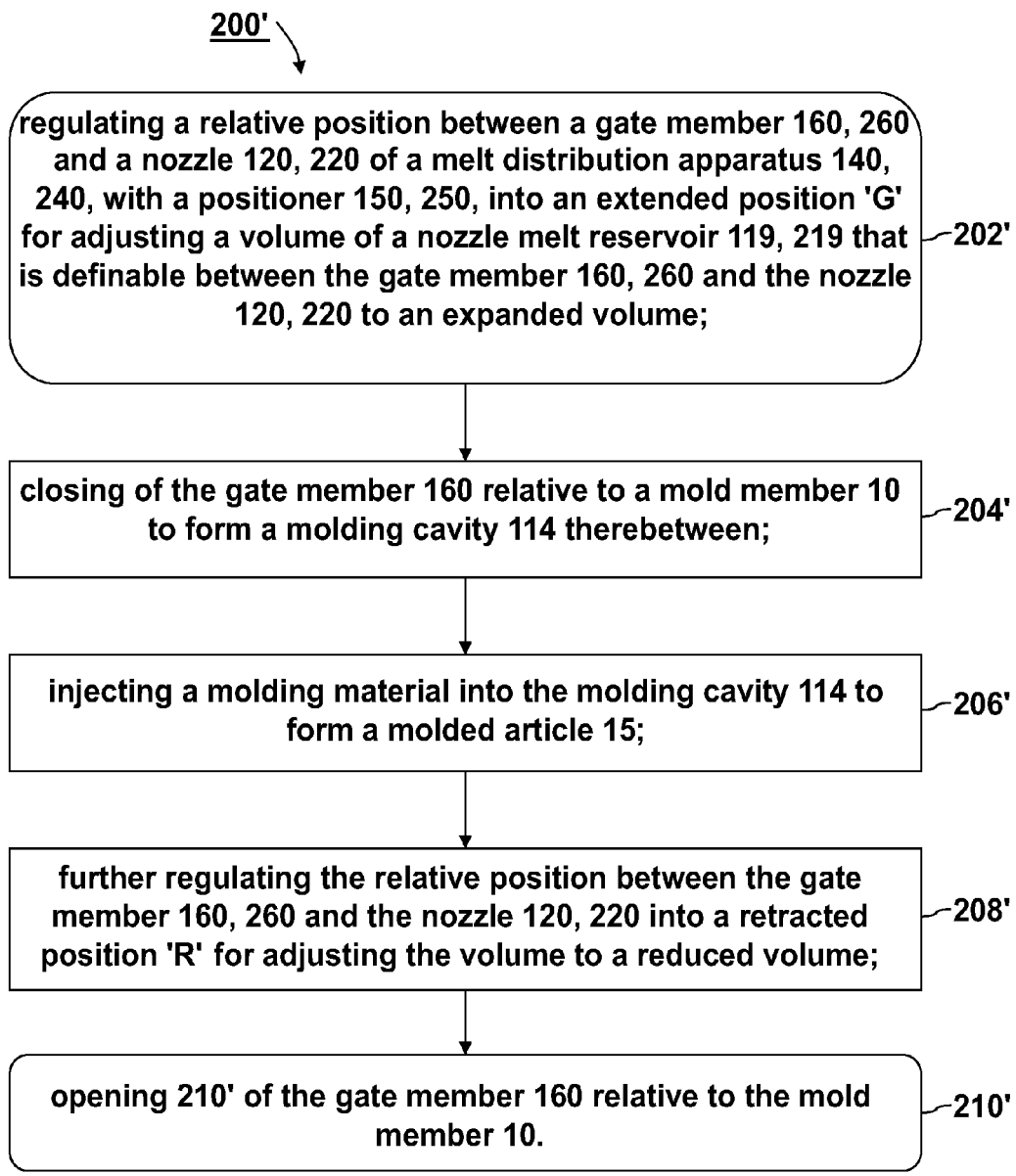
FIG. 4 illustrates the steps of a second variation of an injection molding process that is executable with the non-limiting embodiment of the injection mold of FIG. 2A.

With reference to FIGS. 2A, 2B, and 2C, this sequence of views depicts various steps within a non-limiting embodiment of an injection molding process as executed on a non-limiting embodiment of an injection mold 108. FIG. 2A shows the injection mold 108 in a mold closed configuration just prior to injection of a molding material into a molding cavity 114 that is defined therein. FIG. 2B shows the injection mold 108 in the mold closed configuration after completion of a step of injecting the molding material into the molding cavity to form a molded article 15. Lastly, FIG. 2C shows the step of opening of the injection mold 108 into a mold open configuration just prior to an ejection of the molded article 15 from a mold member 10.

The injection mold 108 includes a melt distribution apparatus 140, a gate member 160, and the mold member 10. The mold member 10 is from the known injection mold 8 described previously. The melt distribution apparatus 140 is configured to fluidly connect a source of molding material, which may be, for example, an injection unit (not shown), with the molding cavity 114 for injecting, in use, the molding material therein. The molding cavity 114 is defined, in use, between the gate member 160 and the mold member 10 when the injection mold 108 is arranged in the mold closed configuration. More particularly, the gate member 160 defines a first molding surface 161 thereon, the first molding surface 161 cooperating, in use, with a second molding surface 111 that is defined by the mold member 10 to form the molding cavity 114 therebetween when the gate member 160 and the mold member 10 are arranged in the mold closed relation configuration (as shown in FIG. 2A).

In contrast with the known injection mold 8 with its gate member 60 being non-movably fixed to the melt distribution apparatus 40, the gate member 160 in the non-limiting embodiment of the injection mold 108 is movable, in use, relative to a nozzle 120 of the melt distribution apparatus 140. In addition, the injection mold 108 also includes a positioner 150 that is linked to the gate member 160 and to the melt distribution apparatus 140. The positioner 150 is configured to regulate, in use, a relative position between the gate member 160 and the nozzle 120 of the melt distribution apparatus 140 between a retracted position 'R' (FIGS. 2A and 2B) and an extended position 'G' (FIG. 2C) for adjusting a volume of a nozzle melt reservoir 119 that is definable therebetween between a reduced volume and an expanded volume, respectively. More particularly, the gate member 160 defines a pocket 162 that is configured to receive, in use, a forward portion 129 of the nozzle 120 of the melt distribution apparatus 140. The nozzle melt reservoir 119 is defined in a space that is between the pocket 162 and the forward portion 129 of the nozzle 120.

In this non-limiting embodiment of the injection mold 108, the nozzle 120 is of the 'hot-tip' variety (as described previously) and includes a housing 137, a nozzle tip member 123, and a nozzle tip retainer 126. The nozzle tip retainer 126 cooperates with the housing 137 and the nozzle tip member 123 for coupling the nozzle tip member 123 to the housing 137. A heater 30 surrounds the housing 137 for a heating of the nozzle 120, in use, to maintain the molding material therein at a desired processing temperature. The forward portion 129 of the nozzle 120 includes an exposed portion of the nozzle tip member 123 and a skirt portion 127 of the nozzle tip retainer 126. The nozzle tip retainer 126 defines a gate interface 128 around an outer surface of the skirt portion 127. In other non-limiting embodiments of the injection mold (not shown), the nozzle 120 may be alternatively configured in accordance with another variety known to those of skilled in art, including, for example, a nozzle that is configured for use with a valve-gate apparatus (not shown). An example of a nozzle that is configured for use with a valve-gate apparatus is described in U.S. Pat. No. 5,518,393 to Gessner, published on May 21st, 1996.

The gate member 160 also defines a nozzle interface 164, wherein the nozzle interface 164 is defined around a boundary of the pocket 162. The gate member 160 further defines a gate 165 that is configured to fluidly connect, in use, the nozzle melt reservoir 119 with a molding cavity 114 that is definable between the gate member 160 and the mold member 10. A coolant channel 31 is defined in the gate member 160. The coolant channel 31 is connectable, in use, to a source and sink (not shown) of a coolant media for circulating a coolant therethrough to cool, in use, the gate member 160.

The nozzle interface 164 and the gate interface 128 are configured to cooperate in providing a slidable sealing junction for substantially preventing a leakage of a molding material therebetween despite sliding relative movements thereof when in use.

In the non-limiting embodiment of the injection mold 108, the positioner 150 is provided by a resiliently compressible element. The resiliently compressible element may be provided, for example, by a die spring. The positioner 150 is configured between the gate member 160 and the melt distribution apparatus 140 wherein the gate member 160 is biased towards the extended position 'G' with the opening of the injection mold 108 (FIG. 2C). In the extended position a gap is provided between a base of the gate member 160 and a face of the melt distribution apparatus 140 and wherein the expanded volume is defined in the nozzle melt reservoir 119. When the injection mold 108 is moved towards a mold closed configuration the action of the mold member 10 bearing against the gate member 160 forces the gate member 160 towards the retracted position 'R' (FIGS. 2A and 2B) wherein the base of the gate member 160 abuts the face of a housing portion of the melt distribution apparatus 140. In the retracted position the reduced volume is defined in the nozzle melt reservoir 119. In the course of arranging the gate member 160 in the retracted position potential energy is stored in the resiliently compressible element. In this way, the relative position of the gate member 160 and the nozzle 120 is regulated between the extended position 'G' and the retracted position 'R' by the positioner 150 responsive to the relative positioning between the mold member 10 and the gate member 160.

In another non-limiting embodiment of the injection mold (not shown), the positioner 150 may be configured to further include, or be replaced with, a stroke-limiting device (not shown). The stroke-limiting device may include, for example, one or more shoulder-type fasteners (not shown) for slidably retaining the gate member 160 to the melt distribution apparatus 140. In operation, a shoulder (not shown) of the fastener would slidably cooperate with a bushing (not shown) provided in the gate member 160 for slidably guiding the gate member 160 between the extended and the retracted positions. Further, a cap (not shown) on the fastener would be configured to cooperate with a face (not shown) of the gate member 160 to define the extended limit of travel that corresponds with the extended position discussed hereinbefore. As with the previous non-limiting embodiment, when the injection mold 108 is moved towards a mold closed configuration the action of the mold member 10 bearing against the gate member 160 forces the gate member 160 towards the retracted position (shown at 'R' in FIGS. 2A and 2B) wherein the base of the gate member 160 abuts the face of a housing portion of the melt distribution apparatus 140. In this way, the stroke-limiting device is configured to cooperate in regulating, in use, the relative position of the gate member 160 and the nozzle 120 between the retracted position and the extended position.

In yet another non-limiting embodiment of the injection mold (not shown), the positioner 150 may be configured to further include, or be replaced with, an actuator that is configured to selectively extend or retract the gate member 160 between the retracted position and the extended position relative to the nozzle 120 of the melt distribution apparatus 140. The type of actuator to be used includes, for example, pneumatic, hydraulic, and electro-mechanical type actuators. A control structure (not shown) associated with the actuator, including, for example, an air or hydraulic control valve, servo drive, and the like, may also be linked, in use, with a controller (not shown), such as, for example, an injection molding system controller (not shown) for the controlled operation of the actuator.

Figure 5A:
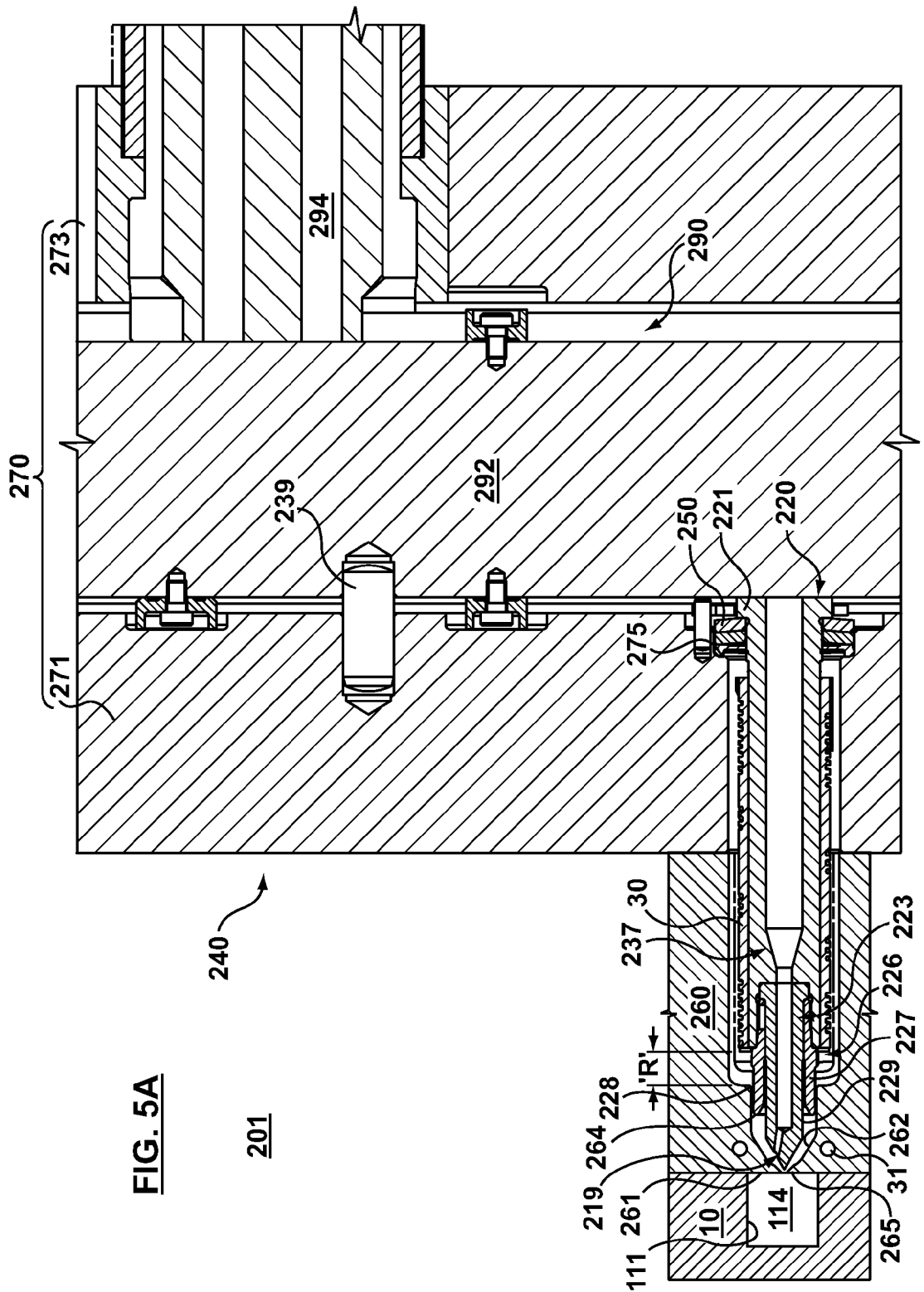
FIG. 5A shows an injection mold in accordance with a further non-limiting embodiment of the present invention, the injection mold being arranged in a closed configuration just prior to injection of a molding material into a molding cavity that is defined therein.
Figure 5B:
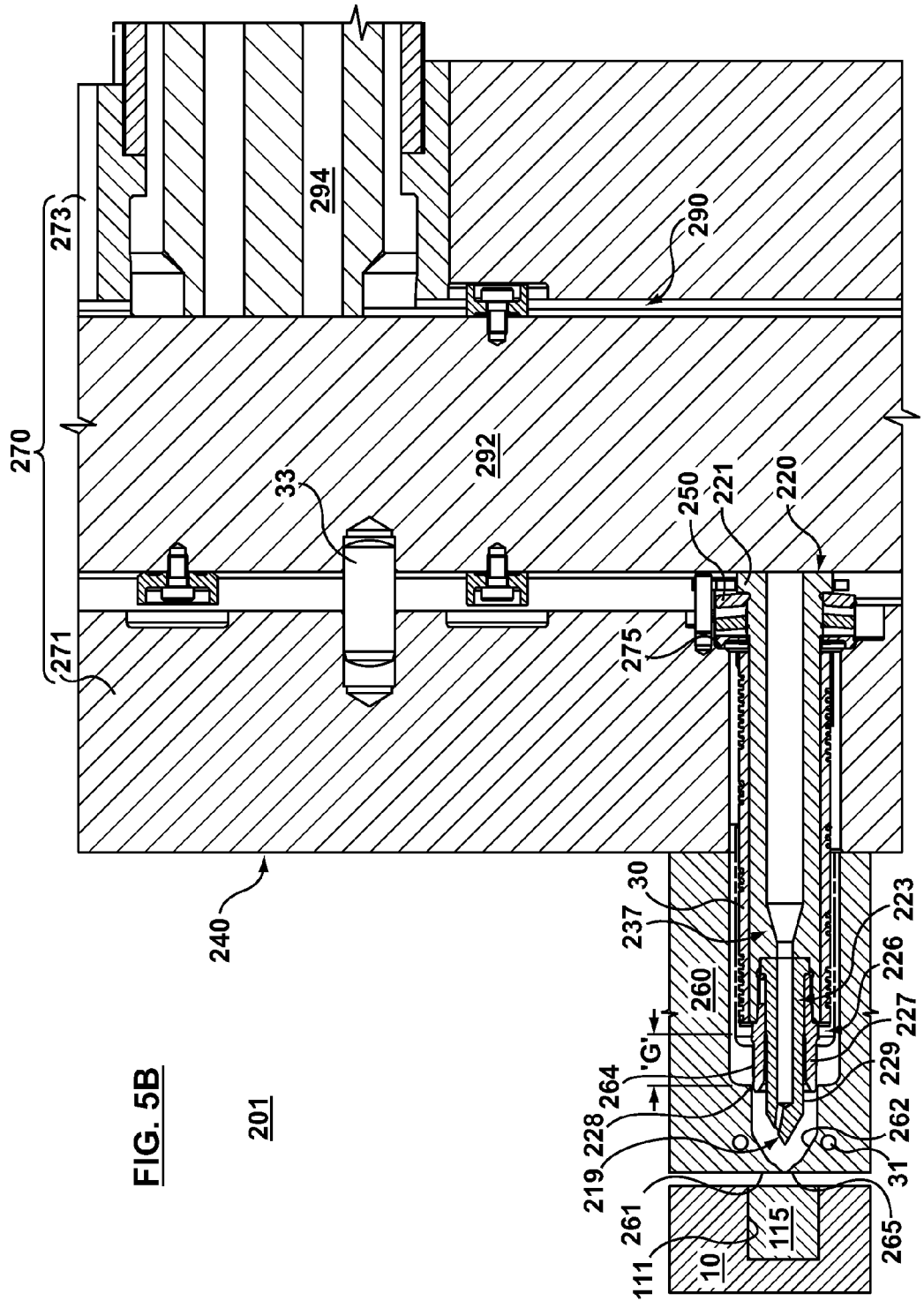
FIG. 5B shows the step of opening of the injection mold of FIG. 5A into a mold open configuration just prior to an ejection of the molded article.

With reference to FIGS. 5A and 5B, this sequence of views depicts various steps within a non-limiting embodiment of an injection molding process as executed on a further non-limiting embodiment of an injection mold 201. FIG. 5A shows the injection mold 201 in a mold closed configuration just prior to injection of a molding material into a molding cavity 114 that is defined therein. FIG. 5B shows the injection mold 108 in the mold open configuration just prior to an ejection of a molded article 15 from the mold member 10. The mold member 10 is from the known injection mold 8 and hence is the same as described previously.

The injection mold 201 includes a melt distribution apparatus 240, a gate member 260, and the mold member 10 (previously described). The melt distribution apparatus 240 is configured to fluidly connect a source of molding material, which may be, for example, an injection unit (not shown), with the molding cavity 114 for injecting, in use, the molding material therein. The molding cavity 114 is defined, in use, between the gate member 260 and the mold member 10 when the injection mold 201 is arranged in the mold closed configuration. More particularly, the gate member 260 defines a first molding surface 261 thereon, the first molding surface 261 cooperating, in use, with the second molding surface 111 that is defined by the mold member 10 to form the molding cavity 114 therebetween when the gate member 260 and the mold member 10 are arranged in the mold closed relation configuration (as shown in FIG. 5A).

The gate member 260 is non-movably connected to the melt distribution apparatus 240, whereas the nozzle 220 is movably connected to the melt distribution apparatus 240 for movement thereof, in use, relative to the gate member 260. The injection mold 201 also includes a positioner 250 that is linked to the nozzle 220 and to a housing portion 270 of the melt distribution apparatus 240. The positioner 250 is configured to regulate, in use, a relative position between the gate member 260 and the nozzle 220 of the melt distribution apparatus 240 between a retracted position 'R' (FIG. 5A) and an extended position 'G' (FIG. 5B) for adjusting a volume of a nozzle melt reservoir 219 that is definable therebetween between a reduced volume and an expanded volume, respectively. More particularly, the gate member 260 defines a pocket 262 that is configured to receive, in use, a forward portion 229 of the nozzle 220 of the melt distribution apparatus 240. The nozzle melt reservoir 219 is defined in a space that is between the pocket 262 and the forward portion 229 of the nozzle 220.

In this non-limiting embodiment of the injection mold 201, the nozzle 220 is of the 'hot-tip' variety (as described previously) and includes a housing 237, a nozzle tip member 223, and a nozzle tip retainer 226. The nozzle tip retainer 226 cooperates with the housing 237 and the nozzle tip member 223 for coupling the nozzle tip member 223 to the housing 237. A heater 30 surrounds the housing 237 for a heating of the nozzle 120, in use, to maintain the molding material therein at a desired processing temperature. The forward portion 229 of the nozzle 220 includes an exposed portion of the nozzle tip member 223 and a skirt portion 227 of the nozzle tip retainer 226. The nozzle tip retainer 226 defines a gate interface 228 around an outer surface of the skirt portion 227. In other non-limiting embodiments of the injection mold (not shown), the nozzle 220 may be alternatively configured in accordance with another variety known to those of skilled in art.

The gate member 260 also defines a nozzle interface 264, wherein the nozzle interface 264 is defined around a boundary of the pocket 262. The gate member 260 further defines a gate 265 that is configured to fluidly connect, in use, the nozzle melt reservoir 219 with a molding cavity 114 that is definable between the gate member 260 and the mold member 10. A coolant channel 31 is defined in the gate member 260. The coolant channel 31 is connectable, in use, to a source and sink (not shown) of a coolant media for circulating a coolant therethrough to cool, in use, the gate member 260.

The nozzle interface 264 and the gate interface 228 are configured to cooperate in providing a slidable sealing junction for substantially preventing a leakage of a molding material therebetween despite sliding relative movements thereof when in use.

In the non-limiting embodiment of the injection mold 201, the positioner 250 is provided by a resiliently compressible element. The resiliently compressible element may be provided, for example, by a die spring, belleville spring washer, and the like. The positioner 250 is arranged between a nozzle flange 221 that is defined at an end of the housing 237 and a seat 275 that is defined in a manifold plate 271. The housing portion 270 includes the manifold plate 271 and a backing plate 273 within which the nozzle 220 along with other interconnected melt distribution components, including a manifold 292 and a sprue bushing 294, are arranged. The positioner 250 in this non-limiting embodiment performs several functions. First, the positioner 250 keeps a sealing face of the nozzle 220 in sealing contact with a face of the manifold 292 as the pair are reciprocated within a manifold pocket nozzle 290 (defined between the manifold plate 271 and the backing plate 273) for sake of positioning of the nozzle 220 between the retracted position 'R' and the extended position 'G'. Further, the positioner 250 is arranged wherein the nozzle 220 is biased towards the extended position 'G' relative gate member 260. The melt distribution apparatus 240 also includes a guiding structure 239, such as a dowel, for guiding of the manifold 292, in use, as it is reciprocated within the manifold pocket 290. The guiding structure 239 includes a first portion that is slidably received within a bore defined in the manifold plate 271 and a second portion that is retained within the manifold 292. Other guiding structures will be apparent to those skilled in the art.

The reciprocation of the manifold 292 and the nozzle 220 follow a reciprocation of the injection unit (not shown) along a longitudinal axis of the sprue bushing 294. The movement of the injection unit is driven by an injection unit carriage actuator (not shown) as is well known to the skilled person. In operation, just prior to a process step of injecting the molding material into the melt distribution apparatus 240, the nozzle 220 is moved towards the retracted position 'ft' (FIG. 5A) as the result of a movement of the injection unit towards the melt distribution apparatus 240 wherein a machine nozzle 295 thereof pushes against the sprue bushing 294. In conjunction with a subsequent step of opening of the injection mold 201 towards the mold open configuration, the nozzle 220 is moved towards the extended position 'G' (FIG. 5B) by the positioner 250 (the resiliently compressible member) with a retreat of the injection unit away from the melt distribution apparatus 240.

The foregoing non-limiting embodiments of the injection mold 108, 201, and alternatives thereto that include the positioner 150, 250 are configured to perform the non-limiting embodiment of an injection molding process 200 that includes the step of regulating the relative position of the gate member 160, 260 and the nozzle 120, 220 of the melt distribution apparatus 140, 240, with the positioner 150, 250, into one of the retracted position 'R' and the extended position 'G' for adjusting the volume of the nozzle melt reservoir 119, 219 between the reduced volume and the expanded volume, respectively.

In accordance with a first variation, the injection molding process 200 includes the steps of
  the regulating 202 the relative position is into the retracted position 'R';
  closing 204 of the gate member 160, 260 relative to the mold member 10 to form a molding cavity 114 therebetween;
  injecting 206 the molding material into the molding cavity 114 to form the molded article 15;
  further regulating 208 the relative position between the gate member 160, 260 and the nozzle 120, 220 into the extended position; and
  opening 210 of the gate member 160, 260 relative to the mold member 10.

Figure 1A:
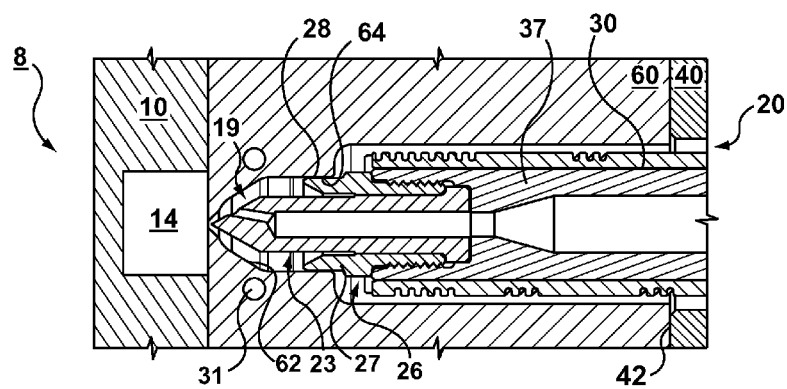
FIG. 1A shows a known injection mold in a mold closed configuration just prior to injection of a molding material into a molding cavity that is defined therein.
Figure 1B:
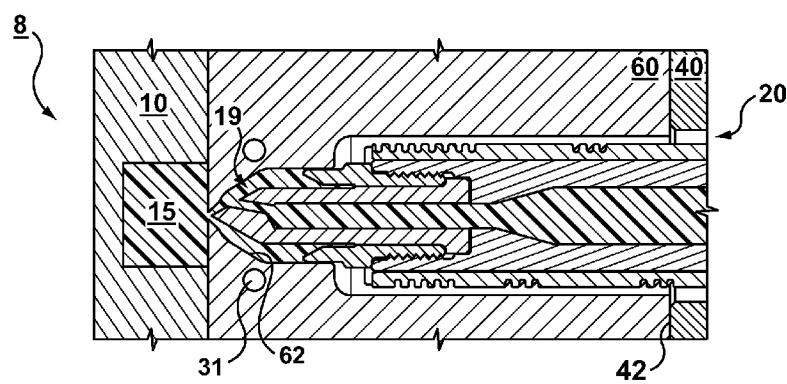
FIG. 1B shows the injection mold of FIG. 1A in the mold closed configuration after completion of a step of injecting the molding material into the molding cavity to form a molded article.
Figure 1C:
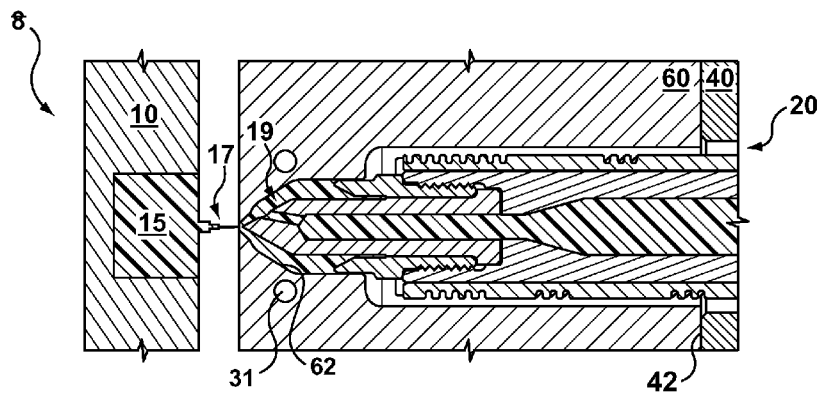
FIG. 1C shows the step of opening of the injection mold of FIG. 1A into a mold open configuration just prior to an ejection of the molded article.

The regulating 202 the relative position into the retracted position may be performed substantially contemporaneously with the closing 204 of the gate member 160, 260 relative to the mold member 10 thereby reducing the volume of the nozzle melt reservoir 119, 219. In addition, the further regulating 208 the relative position into the extended position may also be performed substantially contemporaneously with the opening 210 of the gate member 160, 260 relative to the mold member 10 thereby expanding the volume of the nozzle melt reservoir 119, 219 for receiving an overflow volume of the molding material from a nozzle 120, 220 of the melt distribution apparatus 140, 240. A technical effect of receiving the overflow volume of the molding material in the nozzle melt reservoir 119, 219 may include the reduction or elimination of the gate drool 17 (FIG. 1C) with the opening of the injection mold 108, 201. The foregoing first variation of the injection molding process 200 may replace or complement the requirement for a further known step of decompressing the melt distribution apparatus after completion of a hold portion (i.e. sustained melt pressure) of the step of injecting the molding material, as described hereinbefore with respect to the known injection molding process.

In accordance with a second variation, the injection molding process 200' includes the steps of:
  the regulating 202' the relative position is into the extended position 'G';
  closing 204' of the gate member 160, 260 relative to the mold member 10 to form a molding cavity 114 therebetween;
  injecting 206' the molding material into the molding cavity 114 to form the molded article 15;
  further regulating 208' the relative position between the gate member 160, 260 and the nozzle 120, 220 into the retracted position 'R'; and
  opening 210' of the gate member 160, 260 relative to the mold member 10.

Further, the regulating 202' the relative position into the extended position 'G' may be performed at a time that is prior to completion of the injecting 206', whereafter the further regulating 208' the relative position into the retracted position 'R' is performed thereby reducing the volume of the nozzle melt reservoir 119, 219 for maintaining, for a duration, a pressure of the molding material in the molding cavity. The foregoing second variation of the injection molding process 200' may replace or complement the role of the injection unit (not shown) in performing the hold portion of the step of injecting molding material. A technical effect of the foregoing may include the reduction of the mold cycle time as any molding material entering the molding cavity 114 from the nozzle melt reservoir 119, 219 would already be partially cooled thereby reducing an associated in-mold cooling time requirement.

Other variations of the injection molding process 200 that include the step of regulating the relative position of the gate member 160, 260 relative to the nozzle 120, 220 of the melt distribution apparatus 140 will be apparent to those of skill in the art.

The description of the exemplary embodiments provides examples of the present invention, and these examples do not limit the scope of the present invention. It is understood that the scope of the present invention is limited by the claims. The concepts described above may be adapted for specific conditions and/or functions, and may be further extended to a variety of other applications that are within the scope of the present invention. Having thus described the exemplary embodiments, it will be apparent that modifications and enhancements are possible without departing from the concepts as described. Therefore, what is to be protected by way of letters patent are limited only by the scope of the following claims:

What is claimed is:

1. A molding apparatus, comprising:
 a gate member;
 a nozzle of a melt distribution apparatus;
 a pocket is defined in the gate member for slidably receiving a forward portion of the nozzle;
 a nozzle melt reservoir is defined, in use, in a space that is between the pocket and the forward portion of the nozzle;
 the gate member further configured to define a gate for connecting, in use, the nozzle melt reservoir with a molding cavity that is defined, in part, by a first molding surface on the gate member;
 a positioner that is configured to regulate, in use, a relative position between the gate member and the nozzle between a retracted position and an extended position for adjusting a volume of the nozzle melt reservoir between a reduced volume and an expanded volume, respectively;
 a gate interface is defined on the nozzle;
 a nozzle interface is defined on a portion of the pocket;
 the nozzle interface and the gate interface are configured to cooperate in providing, in use, a slidable sealing junction for substantially preventing a leakage of a molding material therebetween with relative movement thereof.

2. The molding apparatus of claim 1, wherein:
 the positioner is configured to link, in use, the gate member with the melt distribution apparatus.

3. The molding apparatus of claim 1, wherein:
 the positioner is configured to link, in use, the nozzle with a housing portion of the melt distribution apparatus.

4. The molding apparatus of claim 1, wherein:
 the forward portion of the nozzle includes an exposed portion of a nozzle tip member and a skirt portion of a nozzle tip retainer;
 the nozzle interface is defined around a boundary of the pocket; and
 the nozzle tip retainer defines the gate interface around an outer surface of the skirt portion.

5. The molding apparatus of claim 1, further comprising:
 a mold member that is configured to define a second molding surface thereon for cooperating, in use, with a first molding surface defined on the gate member, whereby a molding cavity is defined therebetween when the gate member and the mold member are arranged in a mold closed configuration.

6. The molding apparatus of claim 1, wherein:
 the positioner is provided by a resiliently compressible element, and wherein the relative position between the gate member and the nozzle is biased to the extended position.

7. The molding apparatus of claim 1, wherein:
 the positioner is an actuator that is configured to selectively extend or retract the relative position between the gate member and the nozzle between the retracted position and the extended position relative to the melt distribution apparatus.

8. An injection molding process, comprising:
 closing of a gate member relative to a mold member to form a molding cavity therebetween;
 regulating a relative position between the gate member and a nozzle of a melt distribution apparatus, with a positioner, into a retracted position for adjusting a volume of a nozzle melt reservoir that is definable between the gate member and the nozzle to a reduced volume;
 injecting a molding material into the molding cavity to form a molded article;
 further regulating the relative position between the gate member and the nozzle with the positioner into an extended position for adjusting the volume of the nozzle melt reservoir to an expanded volume; and
 opening of the gate member relative to the mold member;
 wherein the further regulating the relative position into the extended position is performed substantially contemporaneously with the opening of the gate member relative to the mold member thereby expanding the volume of the nozzle melt reservoir to the expanded volume for receiving an overflow volume of the molding material from the nozzle of the melt distribution apparatus.

9. The injection molding process of claim 8, wherein:
 the regulating the relative position into the retracted position is performed substantially contemporaneously with the closing of the gate member relative to the mold member thereby reducing the volume of the nozzle melt reservoir.

10. The injection molding process of claim 8, further comprising:
 regulating the relative position into the extended position at a time that is prior to completion of the injecting, whereafter regulating the relative position into the retracted position is performed thereby reducing the volume of the nozzle melt reservoir for maintaining, for a duration, a pressure of the molding material in the molding cavity.

* * * * *